April 16, 1957 M. A. WACHS 2,788,680
TWO-SPEED TRANSMISSION FOR HELICOPTERS
Filed April 24, 1952 2 Sheets-Sheet 1

INVENTOR
MILLER A. WACHS
BY
ATTORNEY

April 16, 1957 M. A. WACHS 2,788,680
TWO-SPEED TRANSMISSION FOR HELICOPTERS
Filed April 24, 1952 2 Sheets-Sheet 2

INVENTOR
MILLER A. WACHS
BY
ATTORNEY

United States Patent Office 2,788,680
Patented Apr. 16, 1957

2,788,680

TWO-SPEED TRANSMISSION FOR HELICOPTERS

Miller A. Wachs, Stratford, Conn., assignor to United Aircraft Corporation, East Hartford, Conn., a corporation of Delaware Application April 24, 1952, Serial No. 284,189

1 Claim. (Cl. 74—750)

This invention relates to a power transmission gear of the two-speed type having features especially adapting it for the transmission of power from the engine to the rotors of a rotary wing aircraft.

It is an object of this invention to provide an improved transmission of this type in which the weight relative to the power transmitted is very low.

Another object of the invention is to provide a two-speed planetary type transmission in which the parts are designed to have a favorable strength-weight ratio.

A further object of the invention is to provide a change speed gearing of this type having improved hydraulically operated clutch mechanism for effecting the change from one speed to another.

A still further object of the invention is to provide an improved construction for taking out end thrust developed in the transmission by the hydraulic clutch mechanism.

A yet further object of the invention is generally to improve the construction and operation of change speed gearing for helicopter drives.

These and other objects of the invention will be evident or will be pointed out in connection with the description of the accompanying drawing which shows one embodiment of the invention for purposes of illustration.

Figure 1:
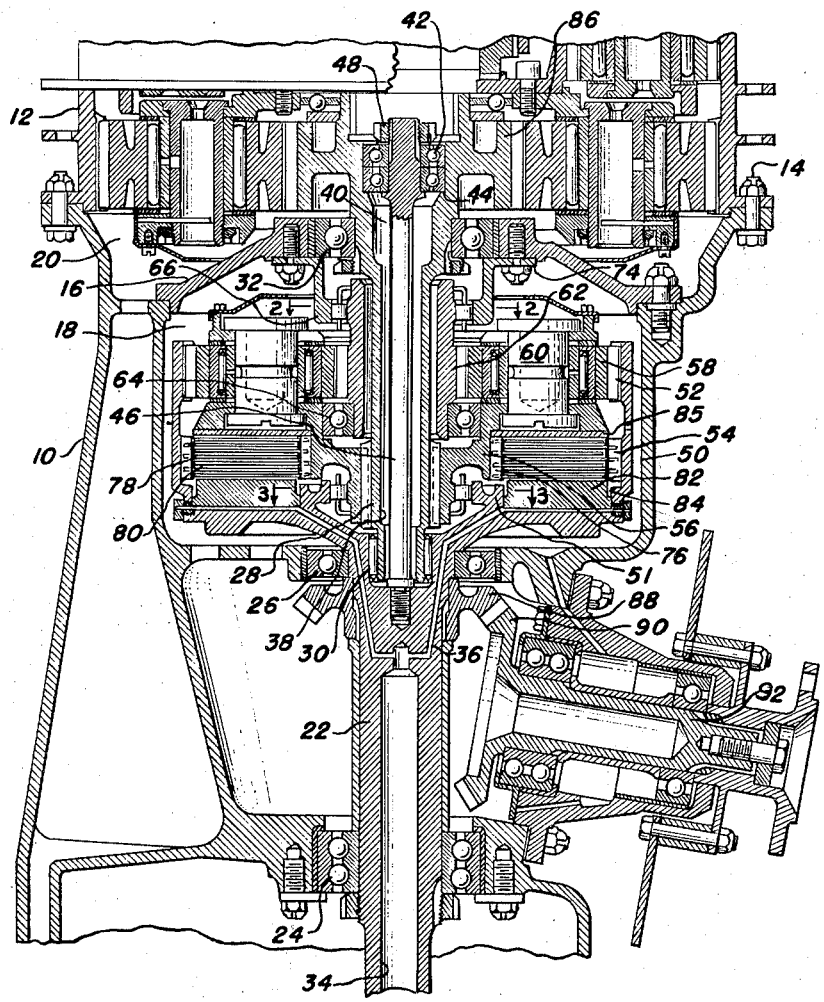
Fig. 1 is a vertical section through a helicopter transmission embodying the invention.

Referring to Fig. 1, the transmission shown comprises a two-stage planetary gearing. The invention is concerned only with the first planetary stage and accordingly only this part of the transmission will be described in detail. The transmission is enclosed in a housing including a lower section 10 and an upper section 12 connected together by a series of bolts 14 which extend through abutting flanges of the sections. The housing sections 10 and 12 are divided by an intermediate wall 16 providing a lower annular chamber 18 in which the first planetary stage is located and an upper annular chamber 20 which houses the second planetary stage.

Referring to the first planetary stage, an engine driven shaft 22 is journalled in the housing on anti-friction bearings 24 and 26 and a rotor driving shaft 28 coaxial therewith is journalled at its lower end in a bearing 30 which is piloted in the upper end of engine driven shaft 22. At its upper end shaft 28 is journalled in a bearing 32 in wall 16. The engine driven shaft 22 has an axial bore 34 which extends through a substantial portion of its length from which hydraulic fluid is conducted through passages 36 to a clutch hereinafter described. The rotor driving shaft 28 is also tubular, the axial passage 38 therethrough having an enlarged diameter upper end 40 in which an anti-friction thrust bearing 42 is disposed which bears against a shoulder 44 in the passage through the shaft. A tension rod 46 extends through the bearing 42 and carries a nut 48 at its upper end which overlies the bearing 42. The lower end of rod 46 is screw threaded into the upper end of the engine driven shaft 22, thus providing a tension member connecting the coaxial engine driven and rotor driving shafts while permitting free relative rotation of the two shafts.

The engine driven shaft 22 carries a cup-shaped casing 50 of relatively large diameter which as shown herein is integral with the shaft. Casing 50 carries an upper ring gear 52 and lower internal splines 54. The rotor driving shaft 28 has splined thereto a planetary spider 56 which carries a plurality of planetary pinions 58 rotatable on studs 60 fixed in spaced relation about the periphery of the spider. These planetary pinions engage the ring gear 52 and also engage a reaction gear 62 which surrounds shaft 28 and is journalled at its lower end in bearings 64 carried by the spider 56. The reaction gear 62 is piloted at its upper end in a roller clutch 66 (Fig. 2) in which a plurality of rollers 68 engage inclined cam faces 70 on the hub of gear 62 and the circular face 72 on a fixed flange member 74 carried by wall 16. The inclination of the cam faces 70 are such that the reaction gear 62 is restrained against clockwise rotation as viewed in Fig. 2.

The spider 56 carries external splines 76 which are in the same planes as the lower internal splines 54 on the casing 50, the annular space between the splines 76 and 54 being occupied by ring-shaped clutch plates 78 and 80 arranged alternately in a stack with the plates 78 having splined engagement with internal splines 54 and the plates 80 having toothed engagement with the external splines 76. A ring-shaped piston 82 engages the lowermost plate of the stack and is movable axially in a shallow cylinder 84 formed in casing 50 by an upstanding annular flange 51. Cylinder 84 communicates with passages 36 which supply fluid under pressure to move the piston axially against the stack of clutch plates. Above the stack an annular plate 85 transmits the thrust of the piston 82 to the spider 56, this thrust being transmitted through the rotor driving shaft 28 to the thrust bearing 42 where it is resisted by tension rod 46 carried by the engine driven shaft 22.

The rotor driving shaft 28 carries a sun gear 86 which transmits the drive to the second stage of the planetary gearing. Since this gearing is a conventional planetary reduction gearing further description is not necessary for an understanding of the invention.

Engine driven shaft 22 carries a beveled gear 88 directly beneath the bearing 26 which meshes with a corresponding beveled gear 90 on a trail rotor drive shaft 92. The latter shaft is used for driving the usual anti-torque rotor required in a helicopter of the type having a single lifting rotor.

Figure 2:
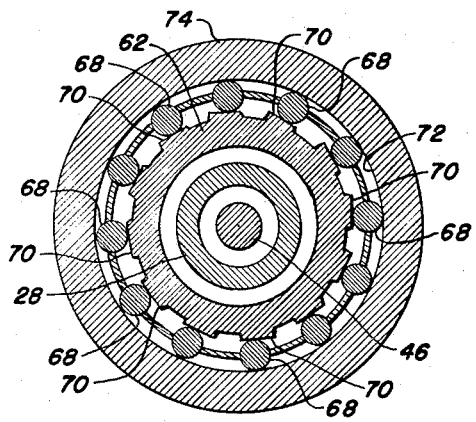
Fig. 2 is a section on line 2—2 of Fig. 1.
Figure 3:
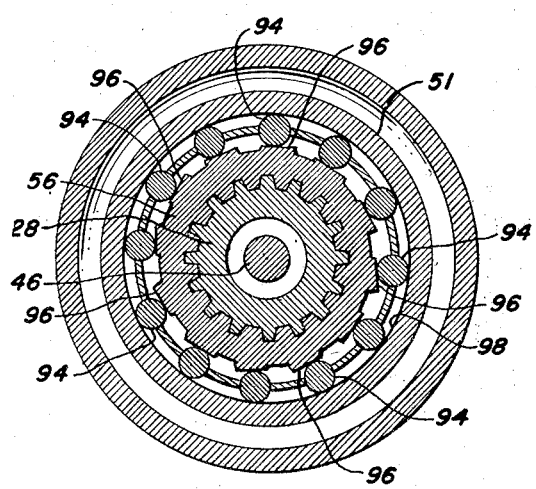
Fig. 3 is a section on line 3—3 of Fig. 1.

It will be evident that when hydraulic fluid under pressure is admitted through the axial bore 34 of shaft 22 and through passages 36 into cylinder 84 beneath the piston 82, frictional engagement between the clutch plates 78 and 80 will effect a solid drive through the first stage of the planetary gearing, since casing 50 and the spider 56 are rigidly connected and no rotation of the planetary pinions about their own axes can take place. Thus casing 50, planetary spider 56, planetary pinions 58 and reaction gear 62 will rotate as a unit bodily about the axis of the gearing and a 1–1 driving ratio between shafts 22 and 28 will result. Thus assuming a counterclockwise rotation of shaft 22 and casing 50 (Fig. 3) shaft 28 will also rotate counterclockwise and reaction gear 62 will be rotated with the planetary pinions in a counterclockwise direction which is permitted by the one way drive clutch rollers 68 (Fig. 2). When the hydraulic pressure on the piston 82 is reduced to permit relative movement of the clutch plate 78 and 80 the counterclockwise rotation of casing 50 will result in a counterclockwise rotation of the planetary pinions about their own axes and a tendency to rotate the reaction gear 62 in a clockwise direction. This rotation of the latter gear, however, is resisted by engagement of the rollers 68 of the roller clutch with cam faces 70 which results in rotation of the rotor driving shaft 28 in a counterclockwise direction but at a lower speed. The particular ratios shown herein provide a 20% reduction in speed but this can be varied by the design of the gears as is well-known in the art. It will be noted that since the reaction gear 62 is required to absorb only the difference in the torques being exerted on the two shafts, this member can be relatively light and small in diameter with a consequent saving in weight and cost.

In a helicopter drive it is not only necessary to provide for driving the rotor from the engine but it is also necessary to permit the rotor to freewheel in the same direction of rotation in the event that the engine fails. This is done by providing a freewheeling roller clutch (not shown) between the engine and the engine driven shaft 22. Further, with the two-speed planetary gearing shown, it is necessary to drive the tail rotor by the rotor during such autorotation, both in high and low speed drives, in order that the torque compensation of the tail rotor may not be lost. In the high ratio drive in which the two shafts 22 and 28 are in effect locked together by the clutch the tail rotor will rotate in the proper relationship to the rotor to maintain torque equilibrium, but in the event of power failure in the lower gear when the clutch is disengaged means are provided in accordance with this invention to drive the shaft 22 from the shaft 28 with a 1–1 ratio. To this end a one-way roller clutch (Fig. 3) is provided in which the rollers 94 are gripped between the inclined faces 96 and the internal cylindrical periphery 98 of flange 51 on casing 50 whenever the shaft 28 tends to overrun shaft 22. It will be evident that the roller clutch does not interfere with the lower ratio drive previously described which is in effect when the clutch is disconnected, since under these conditions the shaft 22 is overrunning the shaft 28, a condition permitted by clutch rollers 94.

It will thus be evident that as a result of this invention a two-speed gearing has been provided which is especially adapted for use in helicopter drives in which two very diverse conditions prevail. When the helicopter is hovering, efficiency demands a low tip speed of the blades combined with large blade incidence; while high forward speed of the helicopter requires a high tip speed, delaying tip stalling of the retreating blade.

It will also be evident that the gearing provided by this invention is particularly favorable to helicopter drives since the components of the gearing are arranged so that the low torque members of the transmission have relatively small diameter as compared to the high torque members.

It will further be evident that as a result of this invention, a particularly compact helicopter drive mechanism has been provided which is light in weight yet amply capable of transmitting the high powers now required of such transmissions.

It will also be clear that the provision of the tension member and its thrust bearing disposed within the axial bore of the rotor driving shaft, and the connection of this tension member to the motor driven shaft, provides a very compact transmission in which all axial thrust between the aligned shafts is taken out within the structure with no appreciable weight penalty. The high prevailing thrust load generated by the clutch is taken out by a very small and light thrust bearing because of the low relative speed of shafts 28 and 22 at beginning of clutch engagement which reduces to zero when the clutch is fully engaged.

While only one embodiment of the invention has been shown and described herein it will be evident that various constructions and arrangements of the parts may be made without departing from the scope of the invention.

I claim:

In a rotary wing aircraft, a main sustaining rotor, an engine driven shaft, a rotor driving shaft, transmission means for driving said rotor driving shaft from said engine driven shaft in powered flight, said transmission means including a support, said engine driven shaft having a cup-shaped casing conneted thereto, said rotor driving shaft extending into said cup-shaped casing, a reaction member adjacent to and surrounding said rotor driving shaft and extending into said cup-shaped casing, said reaction member having a gear thereon, a planetary pinion carrier connected to said rotor driving shaft between said reaction member and the end of said engine driven shaft, planetary pinions on said carrier, said cup-shaped casing having a first internal ring gear with teeth around its side, said planetary pinions meshing with the teeth of said first internal ring gear on said cup-shaped casing and the gear on said reaction member, a one-way clutch between said reaction gear and said support for locking said reaction gear against rotation in a direction opposite to the rotation of said engine driven shaft, external splines on said carrier below said pinions, internal splines on said cup-shaped casing between the teeth of said first internal ring gear and the bottom of said cup-shaped casing, the teeth of said first internal ring gear on said cup-shaped casing being separated from the internal splines on said cup-shaped casing by a necked down portion to prevent the transmission of strain from one to the other, said planetary pinion carrier forming an annular chamber with said cup-shaped casing, said annular chamber having two peripheral walls and two annular walls, one peripheral wall being formed by the external splines of said carrier, the other peripheral wall facing said first wall being formed by the internal splines on said cup-shaped casing, one annular wall being formed on said carrier and extending outwardly from said carrier at a point at one end of said external splines to a point adjacent to said second internal splines, the other annular wall being formed by the face of an annular piston, said piston being slidably mounted in an annular cylinder formed in the bottom of said cup-shaped casing, a multiplicity of annular clutch plates being located in said annular chamber, alternate clutch plates having inner teeth fixedly meshing within said external splines, the remaining clutch plates having external teeth fixedly meshing within said internal splines, hydraulic means for moving said piston toward said other annular wall to place said clutch plates into active engagement, said last named means including a passageway through said engine driven shaft and said cup-shaped casing, said passageway terminating behind said piston in the annular cylinder, formed in the bottom of said cup-shaped casing, a tension member connected to said rotor driving shaft and to said engine driven shaft, said tension member preventing axial movement between said shafts caused by the movement of said piston.

References Cited in the file of this patent

UNITED STATES PATENTS

| | | |
|---|---|---|
| 1,933,424 | Forsyth | Oct. 31, 1933 |
| 2,225,121 | Lundquist | Dec. 17, 1940 |
| 2,348,716 | Banker | May 16, 1944 |
| 2,388,455 | White | Nov. 6, 1945 |
| 2,396,038 | Bossi | Mar. 5, 1946 |
| 2,531,032 | Desmoulins | Nov. 21, 1950 |
| 2,648,386 | Tidd | Aug. 11, 1953 |

FOREIGN PATENTS

| | | |
|---|---|---|
| 824,304 | Germany | Dec. 10, 1951 |